United States Patent [19]
Matsui et al.

[11] Patent Number: 5,172,031
[45] Date of Patent: Dec. 15, 1992

[54] HERMETICALLY SEALED TYPE ELECTRONIC FLASH DEVICE

[75] Inventors: Hideki Matsui; Nobuyoshi Hagiuda; Hiroshi Sakamoto, all of Yokohama; Norikazu Yokonuma, Tokyo, all of Japan

[73] Assignee: Nikon Corporation, Tokyo, Japan

[21] Appl. No.: 807,517

[22] Filed: Dec. 16, 1991

[30] Foreign Application Priority Data

Dec. 21, 1990 [JP] Japan .............................. 2-404103[U]

[51] Int. Cl.$^5$ .......................... H01J 1/60; H05B 31/00
[52] U.S. Cl. .................................. 315/129; 315/241 P; 315/241 S; 354/64; 362/158; 362/267
[58] Field of Search ................ 354/63, 64, 145.1, 416; 315/129, 133, 241 R, 241 P, 241 S; 362/158, 267

[56] References Cited

U.S. PATENT DOCUMENTS 2,996,967  8/1961  Edgerton ............................. 354/64
3,952,190  4/1976  Perkins ................................ 354/64

FOREIGN PATENT DOCUMENTS 51133276  1/1959  Japan .

Primary Examiner—Eugene R. LaRoche
Assistant Examiner—Michael B. Shingleton
Attorney, Agent, or Firm—Shapiro and Shapiro

[57] ABSTRACT

A hermetically sealed type electronic flash device comprises an electric circuit device comprising a main capacitor storing light emitting energy therein prior to light emission, a light emission tube for emitting light by the light emitting energy stored in the main capacitor, and a trigger circuit for applying a trigger voltage to the light emission tube prior to the light emission of the light emission tube, a housing having therein a partition wall hermetically separating the interior of the housing to form a battery chamber and an electric circuit chamber there, the battery chamber being capable of being loaded with a battery for driving the electric circuit device, the electric circuit device being provided in the electric circuit chamber, a leak detecting device provided in the battery chamber for detecting the entry of water into the battery chamber and outputting a leak signal, and a control device provided in the electric circuit chamber and capable of receiving as an input the leak signal from the leak detecting device, the control device controlling the electric circuit device so as to deenergize the trigger circuit and cause the light emitting energy in the main capacitor to be discharged on the basis of the leak signal from the leak detecting device.

6 Claims, 1 Drawing Sheet

HERMETICALLY SEALED TYPE ELECTRONIC FLASH DEVICE

BACKGROUND OF THE INVENTION

1. Field of the Invention

This invention relates to a hermetically sealed type electronic flash device which is usable under water, and particularly to leak preventing structure.

2. Related Background Art

In a hermetically sealed type electronic flash device usable under water (hereinafter referred to as the underwater stroboscope), means for preventing the entry of water is provided and usually, water does not enter into the underwater stroboscope, whereas should water enter into the underwater stroboscope, the user of the underwater stroboscope will become exposed to a danger such as an electric shock by high-tension light emitting energy stored in the underwater stroboscope. Accordingly, as shown in Japanese Laid-Open Utility Model Application No. 51-133276, whenever water has entered into the underwater stroboscope, alarm display has been effected to inform the user of the entry of water.

However, in the prior-art underwater stroboscope, if the user does not notice the alarm display against the entry of water, electrolysis takes place in the underwater stroboscope by the water which has entered thereinto, and hydrogen gas and oxygen gas are produced as follows:

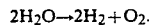

$$2H_2O \rightarrow 2H_2 + O_2.$$

On the other hand, during the light emission of the underwater stroboscope, a trigger voltage of several thousand volts is applied to a light emission tube prior to the light emission and therefore, when the interior of the underwater stroboscope has been filled with the above-mentioned gases, there has been the danger of the stroboscope being exploded during the application of said trigger voltage.

SUMMARY OF THE INVENTION

It is the object of the present invention to provide an electronic flash device which will be safe even if water enters into it.

A hermetically sealed type electronic flash device according to the present invention is such that the interior of the device is separated by a partition wall having a water-proof function into a battery chamber in which is disposed leak detecting means for detecting the entry of water and an electric circuit chamber in which is disposed leak control means operable by a signal from said leak detecting means and that even when the user does not notice the alarm display during the entry of water, hydrogen gas and oxygen gas produced in the battery chamber by electrolysis are prevented from entering into the electric circuit chamber by the partition wall and a trigger circuit is rendered inoperative by the leak control means and light emitting energy stored in a main capacitor is discharged, whereby even if the hydrogen gas and oxygen gas produced in the battery chamber enter into the electric circuit chamber, explosion will not occur.

In the present invention, when water enters into the hermetically sealed type electronic flash device, the leak detecting means for detecting the entry of water transmits the fact of the entry of water to the leak control means, and the leak control means renders the trigger circuit inoperative and effects the discharging of the light emitting energy, whereby an electric shock by the entry of water, explosion, etc. do not occur.

DESCRIPTION OF THE PREFERRED EMBODIMENT

An embodiment of the present invention will hereinafter be described with reference to the drawings.

Figure 1:
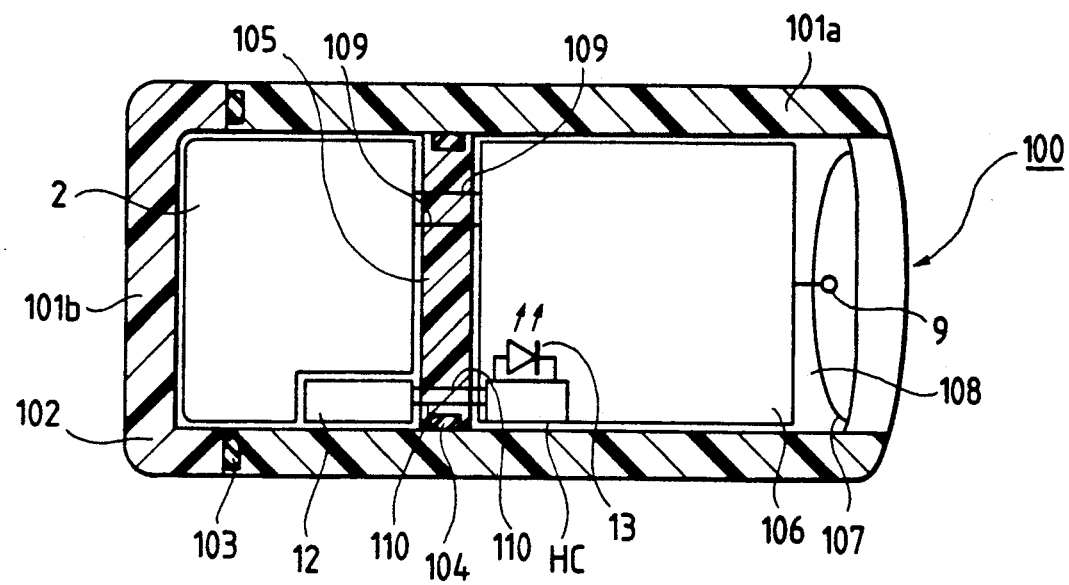
FIG. 1 shows the construction of an embodiment of the hermetically sealed type electronic flash device according to the present invention.
Figure 2:
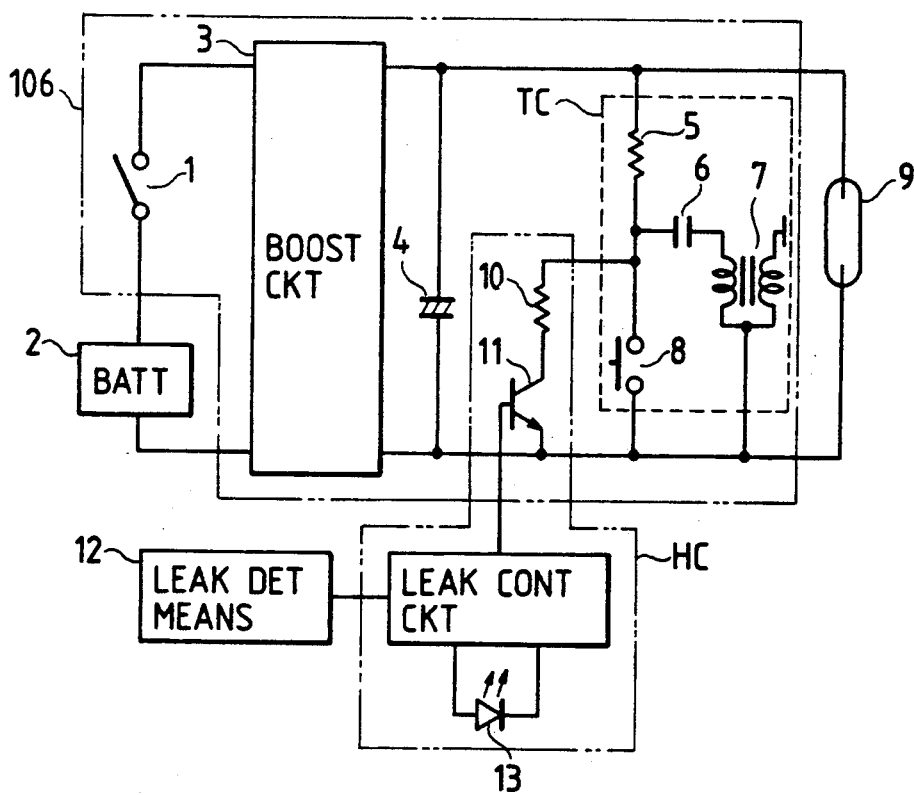
FIG. 2 diagrammatically shows the electric circuit of FIG. 1.

FIG. 1 shows the construction of an embodiment of the hermetically sealed type electronic flash device according to the present invention, and FIG. 2 is a circuit diagram of the hermetically sealed type electronic flash device according to the present embodiment. The operation of the present embodiment will hereinafter be described with reference to FIGS. 1 and 2.

In FIG. 1, the reference numeral 100 designates an underwater stroboscope in the present embodiment, the reference character 101a denotes a stroboscope body, and the reference character 101b designates a back lid for putting a battery 2 into and out of the underwater stroboscope 100. The reference numeral 103 denotes a first 0-ring which prevents the entry of water into the underwater stroboscope 100. The reference numeral 12 designates leak detecting means contained in a battery chamber 102, and the reference numeral 105 denotes a partition wall having a waterproof function. This partition wall 105 is separated into a battery chamber 102 and an electric circuit chamber 108 by a second 0-ring 104. The reference numeral 106 designates an electric circuit portion, the reference numeral 13 denotes display means for informing the user of the entry of water by flickering during the entry of water, the reference numeral 9 designates a light emission tube, and the reference numeral 107 denotes a reflecting mirror. The reference numeral 109 designates a power source pin which electrically connects the battery 2 and the electric circuit portion 106 together. The reference numeral 110 denotes a connecting pin which electrically connects the leak detecting means 12 to leak control means HC contained in the electric circuit chamber 108.

In FIG. 2, the reference numeral 1 designates a power source switch, the reference numeral 2 denotes a battery, and the reference numeral 3 designates a conventional booster circuit for boosting the voltage of the battery 2. The reference numeral 4 denotes a main capacitor for storing light emitting emergy therein. The reference numeral 6 designates a trigger capacitor, the reference numeral 5 denotes a resistor for charging the trigger capacitor 6, the reference numeral 7 designates a trigger transformer for applying a trigger voltage to the light emission tube 9, and the reference numeral 8 denotes a starting switch for causing the trigger voltage to be applied to the light emission tube 9, and these together constitute a trigger circuit TC. The leak control means HC is comprised of a resistor 10, a transistor 11, display means 13, etc., and is designed to render the transistor 11 conductive in response to a signal from the leak detecting means 12.

The operation of the thus constructed underwater stroboscope during the entry of water thereinto is as follows.

By the well-known boosting operation of the booster circuit 3 by the closing of the power source switch 1, the main capacitor 4 is charged with light emitting energy. At the same time, the trigger capacitor 6 is also charged through the resistor 5. When the starting switch 8 is closed at a point of time whereat the charging of the main capacitor 4 is completed, in the trigger circuit TC, a trigger voltage of several thousand volts is applied to the light emission tube 9 by a well-known trigger operation, whereby the light emission tube 9 starts its light emitting operation. If here, water enters into the battery chamber 102 due to the flaw or the like of the first O-ring 103 between the body 101a and the back lid 101b shown in FIG. 1, the leak detecting means 12 detects the entry of water, which is transmitted to the leak control means HC in the electric circuit portion 106 by the connecting pin 110, and the leak control means HC discharges the charges in the trigger capacitor 6 (through the resistor 10 and the transistor 11) and causes the display means 13 to flicker, thereby informing the user of the entry of water into the battery chamber 102. Since the leak control means HC is connected to the main capacitor 4 through the resistor 5, the charges in the main capacitor 4 are also discharged while the charges in the trigger capacitor 6 are discharged. Accordingly, the dangerous voltage in the electric circuit chamber 108 disappears in a short time. On the other hand, the water which has entered into the battery chamber 102 has its entry into the electric circuit chamber 108 precluded by the partition wall 105 and the second 0-ring 104 and therefore, even if a great deal of water enters into the battery chamber 102 and electrolysis is effected by the battery 2 to thereby produce hydrogen gas and oxygen gas, it will never happen that the user immediately runs into a dangerous state (an electric shock, explosionor the like) because the entry of water into the electric circuit chamber 108 is intercepted by the partition wall 105 and the second 0-ring 104.

As described above, according to the present invention, the interior of the underwater stroboscope is separated into two chambers by the partition wall and a minimum number of parts such as a battery and leak detecting means necessary for the underwater stroboscope to function are disposed in the battery chamber always exposed to the danger of the entry of water by the back lid being opened and closed for the interchange of the battery, whereby even if water enters into the battery chamber, the water will not enter into the electric circuit chamber and therefore, even if hydrogen gas and oxygen gas are produced in the battery chamber, the user will not immediately run into a dangerous state, and safety can be greatly improved. Also, if a deoxidizer, a desiccating agent, etc. are put into the electric circuit chamber, the safety against explosion will of course be more enhanced.

What is claimed is:

1. A hermetically sealed type electronic flash device comprising:
    electric circuit means comprising a main capacitor storing light emitting energy therein prior to light emission, a light emission tube for emitting light by the light emitting energy stored in said main capacitor, and a trigger circuit for applying a trigger voltage to said light emission tube prior to the light emission of said light emission tube;
    a housing;
    a partition wall hermetically separating the interior of said housing to form a battery chamber and an electric circuit chamber there, said battery chamber being capable of being loaded with a battery for driving said electric circuit means, said electric circuit means being provided in said electric circuit chamber;
    leak detecting means provided in said battery chamber for detecting the entry of water into said battery chamber and outputting a leak signal; and
    control means provided in said electric circuit chamber and capable of receiving as an input the leak signal from said leak detecting means, said control means controlling said electric circuit means so as to deenergize said trigger circuit and cause the light emitting energy in said main capacitor to be discharged on the basis of the leak signal from said leak detecting means.

2. A hermetically sealed type electronic flash device according to claim 1, further comprising:
    alarm means connected to said leak detecting means for receiving said leak signal as an input to thereby effect alarm display to the photographer.

3. A hermetically sealed type electronic flash device comprising:
    electric circuit means comprising a main capacitor storing light emitting energy therein prior to light emission, a light emission tube for emitting light by the light emitting energy stored in said main capacitor, and a trigger circuit for applying a trigger voltage to said light emission tube prior to the light emission of said light emission tube;
    a housing;
    a partition wall hermetically separating the interior of said housing to form a battery chamber and an electric circuit chamber there, said battery chamber being capable of being loaded with a battery for driving said electric circuit means, said electric circuit means being provided in said electric circuit chamber;
    leak detecting means provided in said battery chamber for detecting the entry of water into said battery chamber and outputting a leak signal; and
    control means provided in said electric circuit chamber and capable of receiving as an input the leak signal from said leak detecting means, said control means controlling said electric circuit means so as to deenergize said trigger circuit on the basis of the leak signal from said leak detecting means.

4. A hermetically sealed type electronic flash device according to claim 3, further comprising:
    alarm means connected to said leak detecting means for receiving said leak signal as an input to thereby effect alarm display to the photographer.

5. A hermetically sealed type electronic flash device comprising:
    electric circuit means comprising a main capacitor storing light emitting energy therein prior to light emission, a light emission tube for emitting light by the light emitting energy stored in said main capacitor, and a trigger circuit for applying a trigger voltage to said light emission tube prior to the light emission of said light emission tube;
    a housing;

a partition wall hermetically separating the interior of said housing to form a battery chamber and an electric circuit chamber there, said battery chamber being capable of being loaded with a battery for driving said electric circuit means, said electric circuit means being provided in said electric circuit chamber;

leak detecting means provided in said battery chamber for detecting the entry of water into said battery chamber and outputting a leak signal; and control means provided in said electric circuit chamber and capable of receiving as an input the leak signal from said leak detecting means, said control means controlling said electric circuit means so as to cause the light emitting energy in said main capacitor to be discharged on the basis of the leak signal from said leak detecting means.

6. A hermetically sealed type electronic flash device according to claim 5, further comprising:

alarm means connected to said leak detecting means for receiving said leak signal as an input thereby effect alarm display to the photographer.

* * * * *